US012755675B2

(12) United States Patent
Li et al.

(10) Patent No.: US 12,755,675 B2
(45) Date of Patent: Oct. 6, 2026

(54) SYSTEM AND METHOD FOR REDUCING POWER CONSUMED BY A DISPLAY

(71) Applicant: Google LLC, Mountain View, CA (US)

(72) Inventors: Bo Li, Folsom, CA (US); Edwin Lyle Hudson, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/913,600

(22) Filed: Oct. 11, 2024

(65) Prior Publication Data

US 2025/0124856 A1 Apr. 17, 2025

Related U.S. Application Data

(60) Provisional application No. 63/589,688, filed on Oct. 12, 2023.

(51) Int. Cl.
*G09G 3/32* (2016.01)
*G09G 3/20* (2006.01)

(52) U.S. Cl.
CPC ............. *G09G 3/32* (2013.01); *G09G 3/2022* (2013.01); *G09G 2300/0857* (2013.01); *G09G 2300/0866* (2013.01); *G09G 2310/0264* (2013.01); *G09G 2320/0219* (2013.01)

(58) Field of Classification Search
CPC ................... G09G 3/32; G09G 3/2022; G09G 2300/0857; G09G 2300/0866; G09G 2310/0264; G09G 2320/0219
See application file for complete search history.

(56) References Cited

U.S. PATENT DOCUMENTS

| | | | | |
|---|---|---|---|---|
| 8,279,687 B2 * | 10/2012 | Adams | G11C 11/419 | 365/189.11 |
| 2007/0189102 A1 * | 8/2007 | Lin | G11C 11/417 | 365/230.06 |
| 2009/0219279 A1 * | 9/2009 | Ishii | H04N 9/3123 | 345/214 |
| 2011/0222355 A1 * | 9/2011 | Nakashima | G11C 11/1673 | 327/315 |
| 2014/0016400 A1 * | 1/2014 | Pelley | G11C 11/418 | 365/154 |
| 2014/0016402 A1 * | 1/2014 | Burnett | G11C 11/412 | 365/156 |
| 2014/0254249 A1 * | 9/2014 | Huang | G11C 11/412 | 365/156 |
| 2015/0055418 A1 * | 2/2015 | Murakami | G11C 16/28 | 365/185.21 |
| 2016/0358644 A1 * | 12/2016 | Holst | G11C 11/419 | |
| 2017/0047005 A1 * | 2/2017 | Jinta | G09G 3/3233 | |
| 2020/0098307 A1 * | 3/2020 | Li | G09G 3/32 | |
| 2021/0233463 A1 * | 7/2021 | Lee | G09G 3/2022 | |

(Continued)

*Primary Examiner* — Ke Xiao
*Assistant Examiner* — Jennifer L Zubajlo
(74) *Attorney, Agent, or Firm* — Brake Hughes Bellermann LLP

(57) ABSTRACT

A word line regulator that can control an SRAM cell during a write process is disclosed. The SRAM cell is coupled to bit lines that are driven using a reduced voltage in order to conserve power. The SRAM cell includes a latch that is powered by a power supply in a power domain that is different from the bit lines. The word line regulator is configured to output a voltage that is based on the different power domains to ensure the proper operation of transistors in the SRAM cell during the write process.

20 Claims, 6 Drawing Sheets

(56) References Cited

U.S. PATENT DOCUMENTS

| | | | | |
|---|---|---|---|---|
| 2023/0130268 | A1* | 4/2023 | Ruta | G11C 5/141 |
| 2024/0363057 | A1* | 10/2024 | Zhai | G09G 3/32 |
| 2025/0037644 | A1* | 1/2025 | Li | G09G 3/32 |

* cited by examiner

SYSTEM AND METHOD FOR REDUCING POWER CONSUMED BY A DISPLAY

CROSS-REFERENCE TO RELATED APPLICATION

The application claims the benefit of U.S. Provisional Application No. 63/589,688 filed on Oct. 12, 2023, which is hereby incorporated by reference in its entirety.

FIELD OF THE DISCLOSURE

The present disclosure relates to a display and more specifically to circuitry and techniques used to reduce a current consumed while addressing the rows and columns of the display.

BACKGROUND

A memory-in-pixel (MIP) display can include a static random access memory (SRAM) cell for each pixel. A binary value can be written to the SRAM cell so that after writing, the SRAM cell is in one of two possible binary states. Each pixel of the display may emit light based on the binary state (i.e., state) of the SRAM cell. Power may be consumed to write to the SRAM cell (i.e., change states), but after writing, the state of the SRAM cell may be maintained with very little power consumption.

SUMMARY

For a display with a million or more pixels, the power consumed by the write operations of the SRAM cells may be significant. A display is disclosed that can reduce the current consumed by a pixel while writing to the SRAM cell of the pixel.

In some aspects, the techniques described herein relate to a pixel for a display, the pixel including: a latch circuit powered by an upper rail voltage and a lower rail voltage; a first bit line coupled to a first output of the latch circuit by a first transistor, the first transistor controlled in a ON condition during a write operation by word line voltage on a word line and a LOW bit line voltage on the first bit line; a second bit line coupled to a second output of the latch circuit by a second transistor, the second transistor controlled in an OFF condition during the write operation by the word line voltage and a HIGH bit line voltage on the second bit line; and a word line regulator configured to control the word line voltage on the word line to float above the HIGH bit line voltage on the second bit line by a threshold voltage to limit a current conducted by the second transistor in the OFF condition during the write operation.

In some aspects, the techniques described herein relate to a method for writing to a memory cell of a pixel array, the method including: driving a first bit line to a lower rail voltage of the memory cell, the first bit line coupled to a first output of a latch circuit via a first transistor, the first transistor coupled at a first gate terminal to a word line; driving a second bit line to a HIGH bit line voltage, the second bit line coupled to a second output of the latch circuit via a second transistor, the second transistor coupled at a second gate terminal to the word line; driving the word line to a word line voltage so that the first transistor is biased in an ON condition to couple the lower rail voltage to the first output of the latch circuit; configuring the latch circuit to output an upper rail voltage of the memory cell to the second output based on the first output being coupled to the lower rail voltage; and controlling the word line voltage to float above the HIGH bit line voltage by a threshold voltage to limit a current through the second transistor while writing to the memory cell of the pixel array.

In some aspects, the techniques described herein relate to a pixel for a display including: a word line; a first bit line driven at a HIGH bit line voltage or a lower rail voltage; a second bit line driven at the lower rail voltage when the first bit line is driven at the HIGH bit line voltage and driven at the HIGH bit line voltage when the first bit line is driven at the lower rail voltage; a latch circuit configured to output an upper rail voltage or the lower rail voltage; a first transistor connected at a first drain terminal to the latch circuit, connected at a first source terminal to the first bit line, and connected at a first gate terminal to the word line; a second transistor connected at a second drain terminal to the latch circuit, connected at a second source terminal to the second bit line, and connected at a second gate terminal to the word line; and a word line regulator configured to generate a word line voltage on the word line that floats above the HIGH bit line voltage by a reference voltage, the HIGH bit line voltage being less than the upper rail voltage.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

A display may include millions of pixels, each having a memory cell (i.e., SRAM cell) that controls a micron-sized light emitting diode (micro-LED) based on its stored binary value (i.e., its state). A write operation may change the state of the memory cell so that the pixels may be switched ON/OFF. The micro-LED display may require millions of write operations per second to render an image. At least one technical problem facing the micro-LED display is reducing the current drawn for each write operation to lower the overall power consumed by the micro-LED display. Reducing the overall power consumed by the micro-LED display can enable the display to be used in mobile applications, such as augmented/virtual reality glasses/goggles, smart watches, smart glasses, and the like.

A pixel array in these displays may function as an SRAM memory that includes a plurality of SRAM cells that can be addressed by row using word lines and by column using bit lines. Addressing the SRAM cells may include coupling the SRAM cells of a row to respective bit lines. The coupling may be initiated by transmitting a word line signal to a word line for the row. After coupling, bit line signals can be transmitted on respective bit lines to program (i.e. write to) the SRAM cells of the row.

Each bit line may have a parasitic capacitance (i.e., capacitance) due to the length and proximity of the conductors in the display. The bit line capacitance is charged while the SRAM cell is programmed (i.e., written). Charging the bit line capacitance (C) takes energy. The energy (E) is quadratically related to the bit line signal ($V_{BL}$) transmitted on the bit line ($E=\frac{1}{2}CV_{BL}^2$) during a write operation.

Reducing the capacitance can reduce the power consumed by the display. One problem facing reducing power in this way is that the bit line capacitance may not be easily reduced without changing the electrical layout of the display. Instead, the bit line signal (i.e., bit line voltage) applied to the bit line may be reduced so that the energy stored in (i.e., consumed by) the capacitance can be reduced. Reducing this bit line voltage can be problematic, however, because it can create a scenario in which a voltage difference between the word line and the bit line generates a current while the state of the SRAM cell is being changed (i.e., flipped). The present disclosure describes a circuit (i.e., word line regulator) that can control the voltage on the word line to mitigate, or prevent, this current while allowing the bit line voltage to be reduced in order to reduce the power consumed by the bit line capacitance, which provides a technical solution to the technical problem described above.

Figure 1:
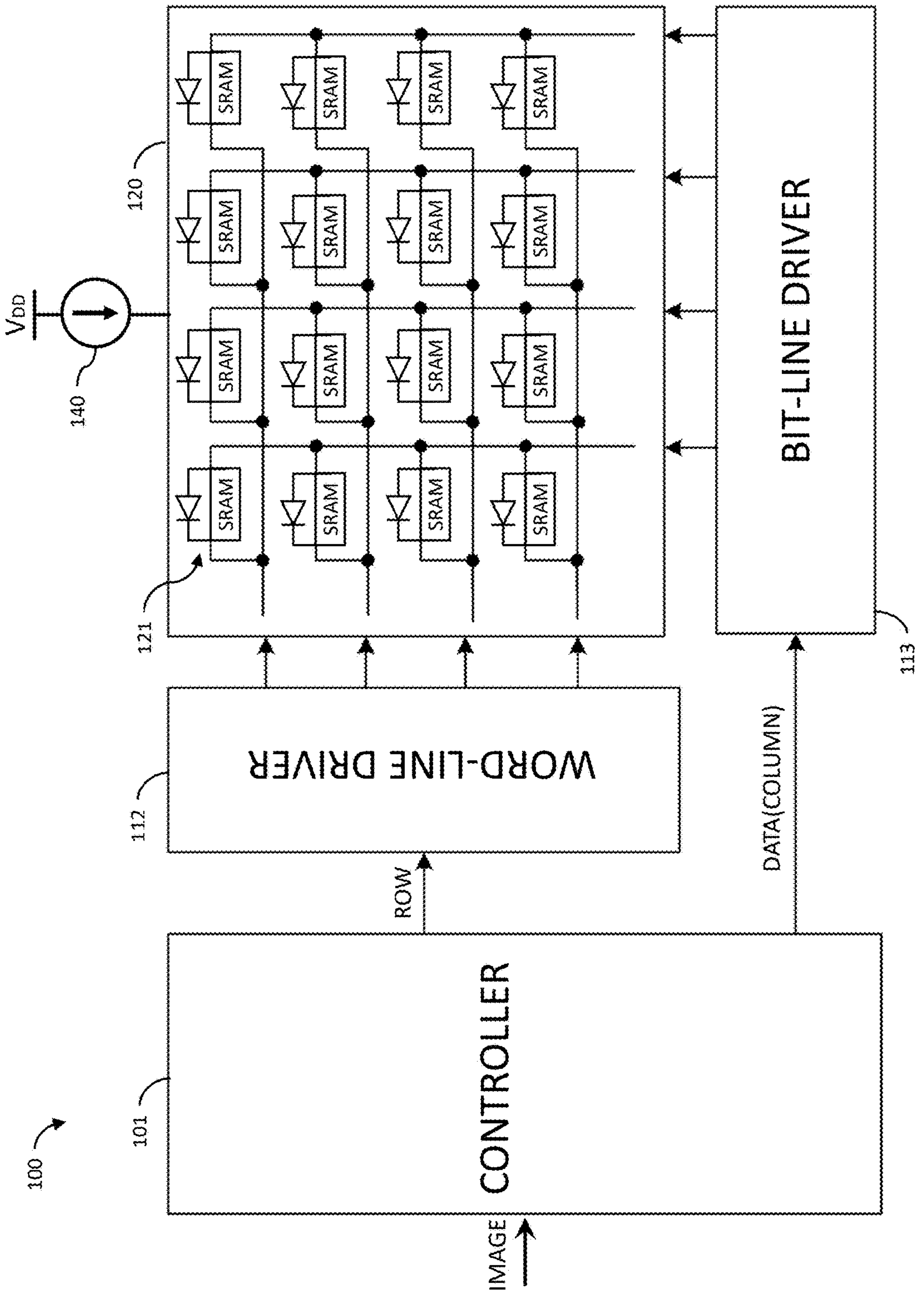
FIG. 1 is a system block diagram of a display according to a possible implementation of the present disclosure.

FIG. 1 is a schematic block diagram of a display according to a possible implementation of the present disclosure. The display 100 includes a plurality of pixels arranged in a 2D grid (i.e., pixel array 120). Each pixel 121 includes a micro-LED configured to generate light while conducting a drive current from a drive current module 140, which can include one or more current sources shared by the pixels. Each pixel 121 further includes a memory cell (e.g., SRAM cell) for setting and maintaining the illumination state of a micro-LED as ON or OFF. The state of an SRAM cell of a pixel can be controlled (i.e., set/reset) by a signal (e.g., bit-line signal) transmitted over a column conductor (i.e., bit-line) coupled to the SRAM cell. The SRAM cell of the pixel is coupled to the bit-line based on a signal (e.g., word-line signal) transmitted over a row conductor (i.e., word-line) to the pixel. Accordingly, the display 100 further includes a word-line driver 112 configured to transmit a word-line signal to a word-line (i.e., row) of the pixel array 120. The word-line signal can activate a row so that each pixel in an active row is coupled to its respective bit-line.

As shown in FIG. 1, the display 100 further includes a bit-line driver 113 configured to transmit bit-line signals to the bit-lines of the pixels in an active row. The bit-line signals may change or maintain the state of the SRAMs in the active row according to an image for display. In a possible implementation, a bit-line signal is a differential signal. In this case, each bit-line may include a positive bit-line (BL+) configured to carry a positive bit-line signal and a negative bit-line configured to carry a negative bit-line signal (BL−). In this differential configuration, the positive bit-line and the negative bit-line may be referred to collectively as the bit-line.

The display 100 further includes a controller 101 configured to control the operation of the word-line driver 112 and the bit-line driver 113 to render an image on the pixel array 120. For example, the controller 101 may transmit a word-line signal (i.e., ROW) to activate a row and then transmit the image data (i.e., DATA(COLUMN)) to the columns of the activated row in parallel.

In a possible implementation, a rendering process includes transmitting a word-line signal to activate a row. After being activated, a bit-line signal for each pixel in the row controls the pixel ON/OFF according to the image data for each pixel in the active row. After the bit-line signals configure (i.e., write to) the pixels of the active row, the row may be deactivated, and another row may be activated until all rows of an image have been activated. The SRAM cells for pixels in deactivated rows can hold the pixels of the deactivated rows ON or OFF while the other rows of the image are activated. After writing an image to the SRAM cells of the pixel array 120, the SRAM cells can hold their values (e.g., 0, 1) until they are changed. As a result, updating the values in an SRAM display may only require a portion of the SRAM cells to change their state (i.e., flip) from image to image. This feature of the display contributes to the low power consumption of the display. A sequence of binary images, in which each pixel is either ON (e.g., SRAM at binary 1) or OFF (e.g., SRAM at binary 0) may be rendered at a high rate to create a grayscale image perceived by an observer.

The disclosed display is well suited for displaying digital images with pixels that are either ON or OFF. The digital image can be a bit plane. A series of bit planes can be displayed in rapid sequence so that a viewer perceives a grayscale image. A color display can render color images based on grayscale images for each color channel.

Figure 2:
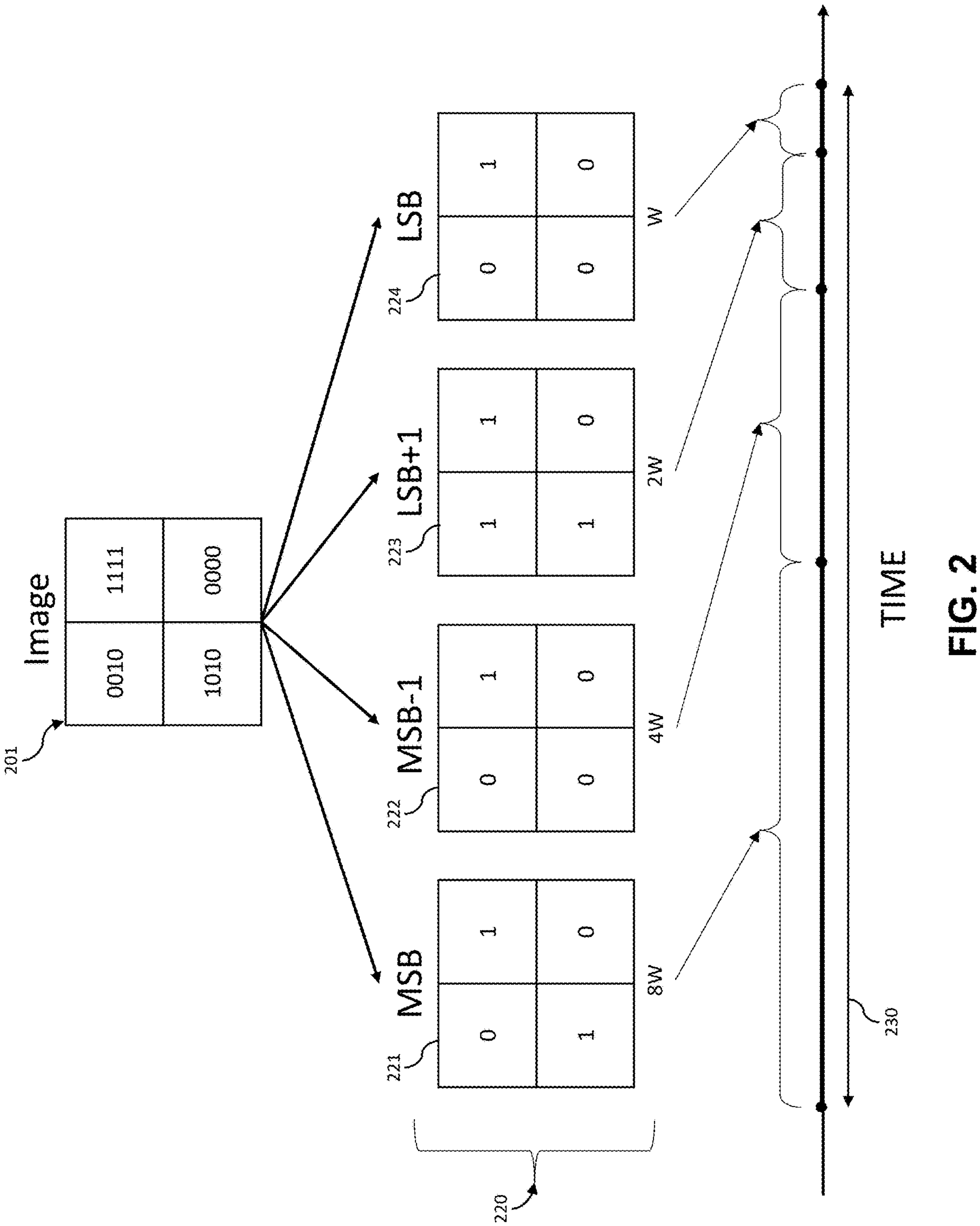
FIG. 2 illustrates a bit-plane sequence based on an image according to a possible implementation of the present disclosure.

FIG. 2 illustrates a bit plane sequence based on an image according to a possible implementation of the present disclosure. In this example, an image 201 has four pixels. Each pixel defines a location and a grayscale level. The grayscale levels are represented as binary numbers. The binary numbers have a number of bits corresponding to the bit depth of the display. In the example shown, the display is a four-bit display in which the gray scale level of each pixel is represented by a binary number with four bits arranged left-to-right from the most significant bit (MSB) to the least significant bit (LSB).

A bit plane sequence 220 can be generated to have a bit plane for each bit of the binary number. In other words, each pixel in a bit plane can be ON (e.g., 1) or OFF (e.g., 0) according to the bit. As shown, the bit plane sequence 220 includes four bit planes. A first bit plane in the sequence is a binary image that represents the most significant bit (MSB) of each pixel (i.e., the most significant bit plane 221). A second bit plane 222 is less significant than the most significant bit plane 221. A third bit plane 223 is less significant than the second bit plane 222 but is more significant than the least significant bit plane 224, which represents the least significant bit (LSB) of each pixel.

The significance of the bit planes with respect to the gray scale value decreases from the most significant bit plane 221 to the least significant bit plane 224. Accordingly, a first bit plane may be referred to as being below a second bit plane when the first bit plane is of lower significance (in the bit plane sequence 220) than the second bit plane. Likewise, the second bit plane may be referred to as being above the first bit plane when the second bit plane is of higher significance (in the bit plane sequence 220) than the first bit plane.

Rendering the gray scale image may include writing each bit plane to the pixel array (i.e., SRAM) in succession during a rendering period 230. When each bit plane is displayed at the same intensity, each bit plane may be weighted by the duration that it is displayed relative to the other bit planes during the sequence. As shown, the weights (W) of the bit planes may double for each bit plane from the least significant bit plane 224 to the most significant bit plane 221. In other words, the portions of a rendering period may double for each successive bit plane from the least significant bit plane 224 to the most significant bit plane 221 displayed during the rendering period 230.

Rendering a grayscale image using multiple bit planes may require a large number of write operations during the rendering period 230. Rendering one bit plane can include writing to each row in the pixel array. Accordingly, despite a low power consumed to write to a single row, the cumulative power consumed to write to (i.e., address) every row in the bit plane may be larger than desired for some applications (e.g., battery operated applications). Further, the cumulative power consumed to address every row in every be plane of a sequence of bit planes is even larger, especially for high bit depth displays. The disclosed circuits and methods can reduce this overall power consumption by reducing the power required to address pixels during write operations.

Figure 3:
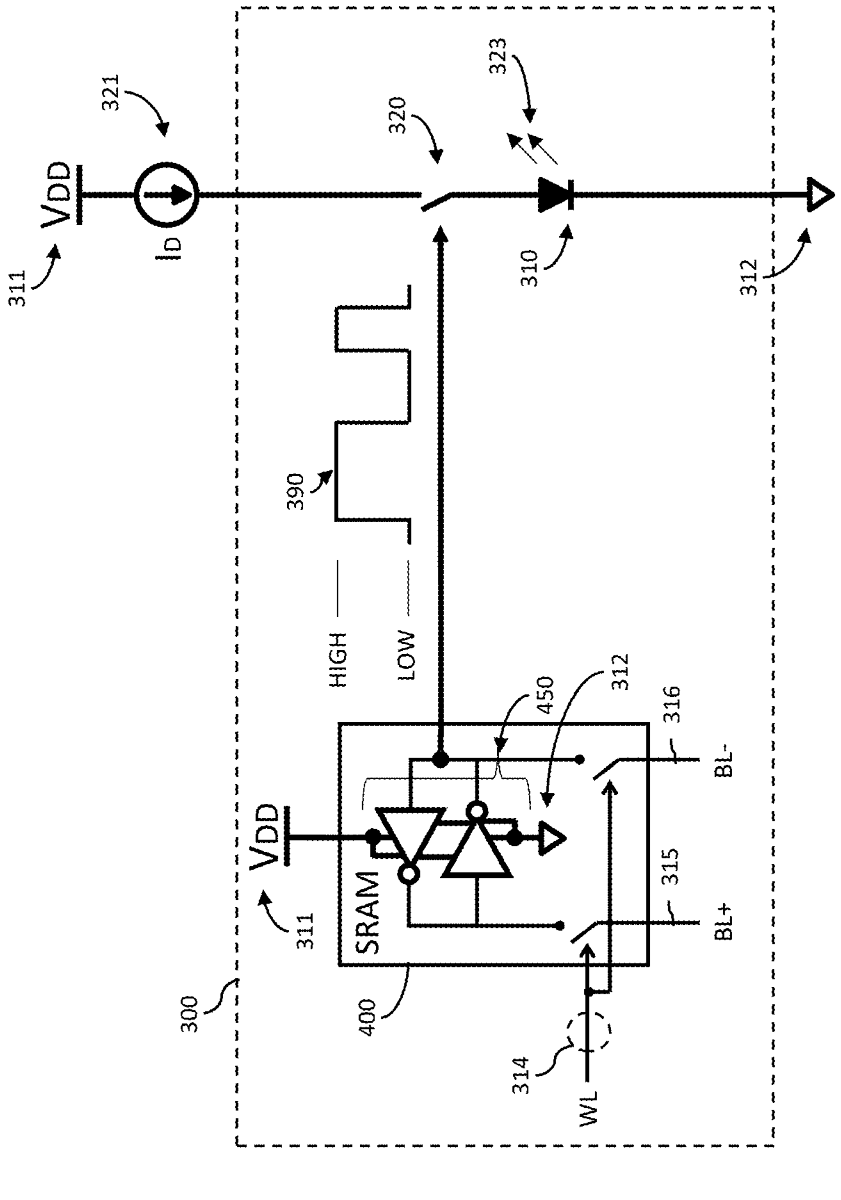
FIG. 3 is a schematic of a pixel for a micro-LED display according to a possible implementation of the present disclosure.

FIG. 3 is a schematic of a pixel for a micro-LED display according to a possible implementation of the present disclosure. As shown in FIG. 3, the pixel 300 includes a drive switch 320 coupled between a micro-LED 310 and a current source 321. The current source 321 may be part of the drive current module 140 shown in FIG. 1. The drive switch 320 can be in a short circuit state (i.e., ON-condition) so that the micro-LED 310 is illuminated (i.e., generates light 323) by the current of the current source 321. Alternatively, the drive switch 320 can be in an open circuit state (i.e., OFF-condition) so that the micro-LED 310 is dark because it receives no current.

As shown in FIG. 3, the drive switch 320 can be controlled ON or OFF according to the state (i.e., the stored value) of a static random-access memory cell (i.e., SRAM cell 400). The SRAM cell 400 receives power for operation from a power supply, which is coupled to each pixel of the pixel array 120. The power supply includes an upper rail voltage 311 ($V_{DD}$)) and a lower rail voltage ($V_{SS}$). The lower rail voltage ($V_{SS}$) is shown as a ground voltage 312 (i.e., ground), but could be implemented differently (e.g., a negative voltage). The SRAM cell 400 may be configured to output a HIGH voltage equal to the upper rail voltage 311 (i.e., $V_{DD}$) while in a HIGH state (i.e., ON-state) or output a LOW voltage equal to the ground voltage 312 while in a LOW state (i.e., OFF-state).

An advantage of using an SRAM cell 400 to control the drive switch 320 is that while the SRAM cell 400 is in the HIGH-state (i.e., ON-state) or the LOW-state (i.e., OFF-state) it consumes very little current (e.g., approximately zero current) from the power supply. The SRAM cell 400 draws most of its current (e.g., approximately all of its current) as it transitions (i.e., is flipped) between states (i.e., during a write process).

As shown in FIG. 3, the SRAM cell 400 includes two inverters (i.e., a pair of inverters) coupled in parallel with their polarities reversed (i.e., coupled output to input). The pair of inverters function as a digital latch circuit (i.e., latch circuit 450). A write operation (i.e., write process) configures latch circuit 450 into one of two states: an ON-state to output a signal corresponding to a logical HIGH (i.e., 1) and an OFF-state to output a signal corresponding to a logical LOW (i.e., 0).

The write process to change the state of the SRAM cell 400 may include addressing the SRAM cell 400 using a word line 314 and asserting voltages on the latch circuit 450 using a positive bit line 315 (i.e., first bit line) and negative bit line 316 (i.e., second bit line).

During the write process, the latch circuit 450 is coupled to the positive bit line 315 and negative bit line 316 by switches, which are controlled by a word-line signal (WL) transmitted on the word line 314. For example, a first level (e.g., HIGH) on the word line 314 turns the switches ON to couple the input/output of latch circuit 450 to respective positive/negative lines of the bit line. A second level (e.g., LOW) on the word line 314 turns the switches OFF to decouple the input/output of the latch circuit 450 from the bit-line drivers so that the state is stored.

More specifically, the state of the SRAM cell 400 may be flipped by a positive bit line signal (BL+) transmitted to the latch circuit 450 by the positive bit line 315 and a negative bit line signal (BL−) transmitted to the latch circuit 450 by the negative bit line 316. The applied bit line signals (BL+, BL−) correspond to the desired state of the latch. Once the desired state is set, the output of the latch circuit 450 is stable and the signals (BL+, BL−) may be removed. The state of the SRAM cell 400 appears as a voltage at the output of one of the inverters of the latch circuit 450.

The state of the SRAM may be toggled to form a pulse width modulation signal (i.e., PWM signal 390) that controls the drive switch 320 so that a drive current ($I_D$) is received by the micro-LED 310 during the ON portions of the PWM signal 390. The modulation of the PWM signal 390 may toggle between the upper rail voltage 311 and the lower rail voltage (i.e. ground voltage 312).

Figure 4:
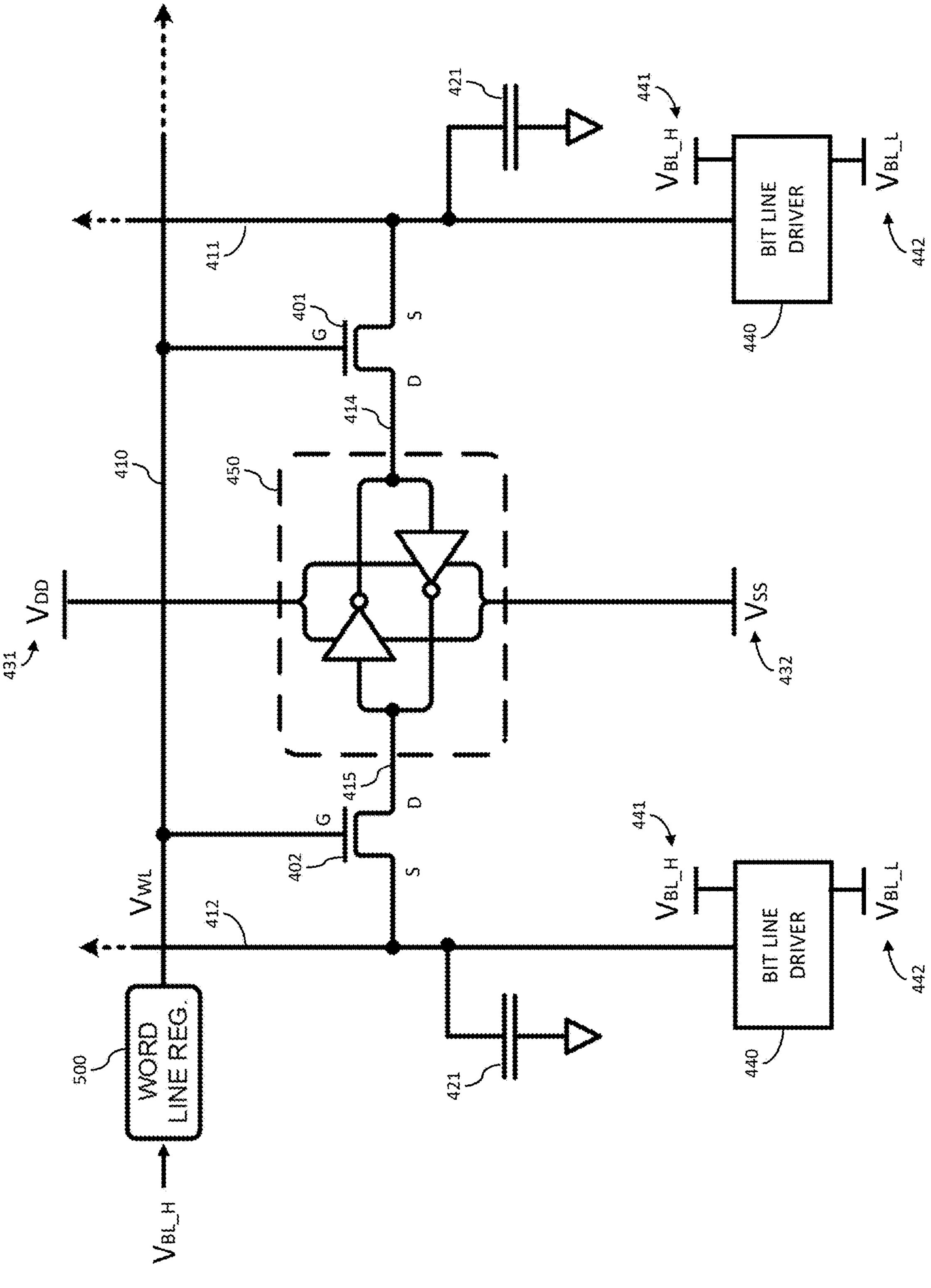
FIG. 4 is a schematic of an SRAM cell for a pixel according to a possible implementation of the present disclosure.

FIG. 4 is a schematic of an SRAM cell for a pixel according to a possible implementation of the present disclosure. The SRAM cell includes a latch circuit 450 including a first inverter and a second inverter coupled in anti-parallel connection between a first output 414 and a second output 415. The first output 414 is coupled to a first bit line 411 by a first transistor 401. The second output 415 is coupled to a second bit line 412 by a second transistor 402.

The latch circuit 450 is powered by an upper rail voltage 431 and a lower rail voltage 432. As a result, the latch circuit 450, may be configured to output the upper rail voltage ($V_{DD}$)) while in a first state and output the lower rail voltage ($V_{SS}$)) in a second state. As mentioned previously, the $V_{DD}$ (i.e., HIGH) and $V_{SS}$ (i.e. LOW) output can drive the drive switch 320 in an ON-condition or an OFF-condition respectively. The latch circuit power domain (i.e. $V_{DD}-V_{SS}$) may match the power domain of the pixel shown in FIG. 3. Accordingly, the lower rail voltage ($V_{SS}$) may be ground.

The first transistor 401 is coupled at a gate terminal (G) to a word line 410, coupled at a source terminal(S) to the first bit line 411, and coupled at a drain terminal (D) to the first output 414 of the latch circuit 450. Accordingly, the ON-condition (i.e., conducting) or OFF-condition (i.e., not conducting) of the first transistor 401 can be controlled by the word line signal ($V_{WL}$) on the word line 410 and the bit line signal on the first bit line 411.

The bit line signal on the first bit line 411 may be a HIGH bit line voltage 441 ($V_{BL\_H}$) or a LOW bit line voltage 442 ($V_{BL\_L}$). The bit line signal may be generated by a bit line driver 440 operating in a bit line power domain ($V_{BL\_H}-V_{BL\_L}$) which is less than the latch circuit power domain (i.e., $V_{DD}-V_{SS}$). In a possible implementation, the HIGH bit line voltage ($V_{BL\_H}$) of the first bit line 411 is less than the upper rail voltage (i.e., $V_{BL\_H}<V_{DD}$). For example, the HIGH bit line voltage can be 50 percent or less than the upper rail voltage. In a possible implementation, the LOW bit line voltage ($V_{BL\_L}$) of the first bit line 411 is equal to the lower rail voltage (i.e., $V_{BL\_L}=V_{SS}$). For example, the LOW bit line voltage can be ground.

The second transistor 402 is coupled at a gate terminal (G) to the word line 410, coupled at a source terminal(S) to the second bit line 412, and coupled at a drain terminal (D) to the second output 415 of the latch circuit 450. Accordingly, the ON-condition (i.e., conducting) or OFF-condition (i.e., not conducting) of the second transistor 402 can be controlled by the word line signal ($V_{WL}$) on the word line 410 and the bit line signal on the second bit line 412.

The bit line signal on the second bit line 412 may be a HIGH bit line voltage 441 ($V_{BL\_H}$) or a LOW bit line voltage 442 ($V_{BL\_L}$). The bit line signal may be generated by the bit line driver 440 operating in a bit line power domain ($V_{BL\_H}-V_{BL\_L}$) which is less than the latch circuit power domain (i.e., $V_{DD}-V_{SS}$). In a possible implementation, the HIGH bit line voltage ($V_{BL\_H}$) of the second bit line 412 is less than the upper rail voltage (i.e., $V_{BL\_H}<V_{DD}$). For example, the HIGH bit line voltage can be 50 percent or less than the upper rail voltage. In a possible implementation, the LOW bit line voltage ($V_{BL\_L}$) of the second bit line 412 is equal to the lower rail voltage (i.e., $V_{BL\_L}=V_{SS}$). For example, the LOW bit line voltage can be ground.

The HIGH bit line voltage being less than the upper rail voltage can reduce a power consumed by a bit line capacitance 421 of the first bit line 411 and the second bit line 412. In other words, the HIGH bit line voltage can be reduced (from the upper rail voltage 431) to achieve a power savings. The reduction may be based on a target power savings and the bit line capacitance 421. Reducing the bit line power domain can create problems in controlling the current conducted by the first transistor 401 and the second transistor 402. For example, if the HIGH bit line voltage is made too low compared to the word line voltage ($V_{WL}$) then the first transistor 401 or the first transistor 401 may be placed in an ON condition when it should be in an OFF condition during a write operation.

During a write operation, one of the bit lines (e.g., the first bit line 411) is driven to the HIGH bit line voltage and the other of the bit line (e.g., the second bit line 412) is driven to the LOW bit line voltage (e.g., the lower rail voltage). The transistor coupled to the LOW bit line voltage is placed in an ON condition which forces this output of the latch circuit 450 circuit to the lower rail voltage (e.g. ground). Feedback in the latch circuit then configures the other output of the latch circuit to the upper rail voltage. To prevent the voltage difference between the upper rail voltage and the (smaller) HIGH bit line voltage from creating a current, the transistor coupled to the HIGH bit line voltage should be in an OFF condition. Controlling this transistor to be OFF may be problematic without some control over the word line voltage ($V_{WL}$) because of fluctuations in the HIGH bit line voltage levels and variations in the transistors (e.g., due to process, aging, temperature, etc.). Accordingly, the SRAM cell of the pixel includes a word line regulator 500 configured to generate a word line voltage ($V_{WL}$) based on the HIGH bit line voltage. For example, the word line regulator can control the word line voltage on the word line to float above the HIGH bit line voltage by a threshold voltage ($V_{TH}$) of the first transistor 401 and the second transistor 402 so that the transistor (i.e., $V_{WL}=V_{BL\_H}+V_{TH}$).

Figure 5:
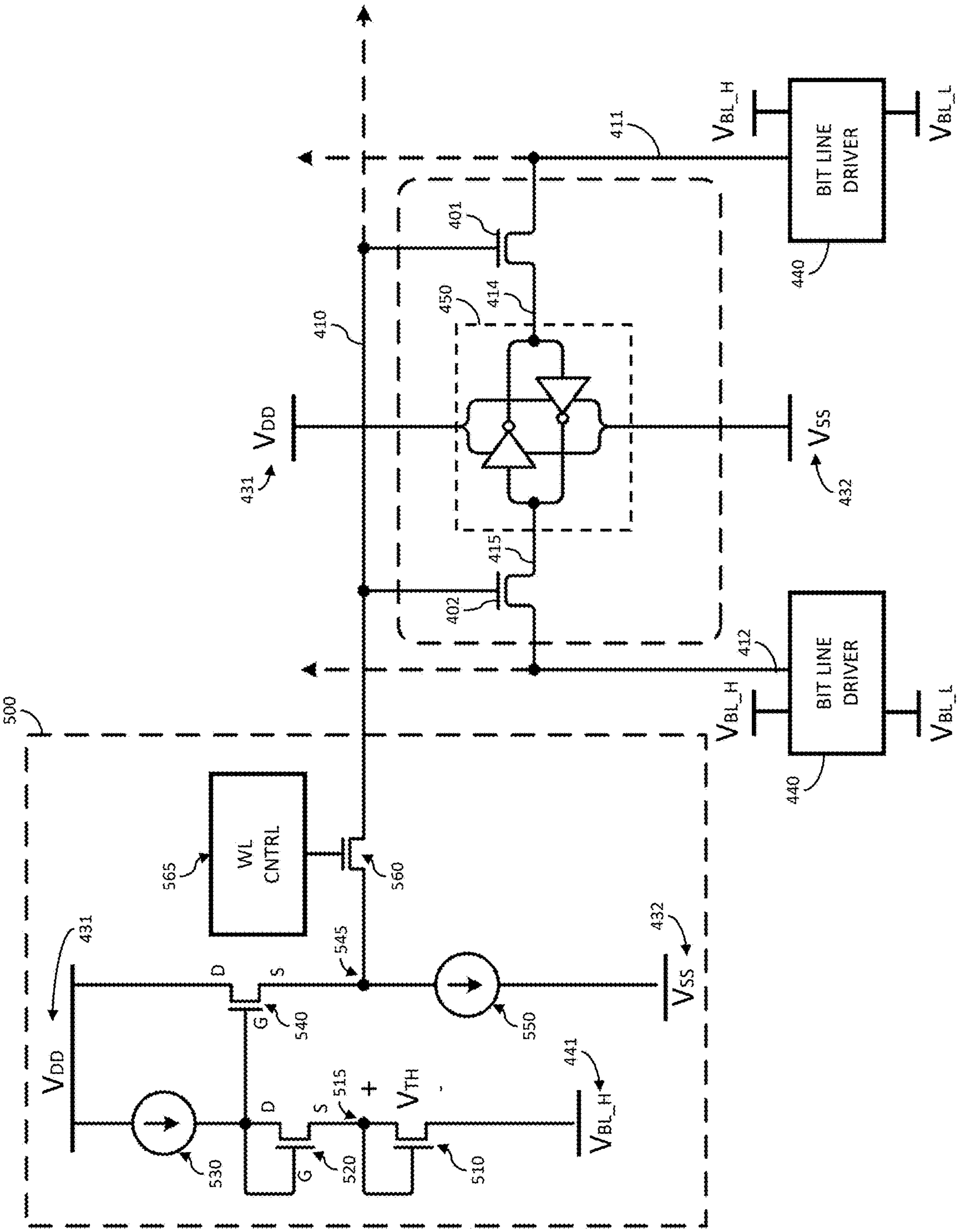
FIG. 5 is a schematic illustrating a word line regulator for an SRAM cell according to a possible implementation of the present disclosure.

FIG. 5 is a schematic illustrating a word line regulator for the SRAM cell according to a possible implementation of the present disclosure. The word line regulator 500 can be powered by the upper rail voltage 431 and the lower rail voltage 432 of the pixel.

The word line regulator 500 includes a reference voltage source configured to receive the HIGH bit line voltage 441 and to generate a reference voltage at a reference node 515. In a possible implementation, the reference voltage source is a diode connected transistor 510, configured to generate a drain-to-source voltage equal to the threshold voltage ($V_{TH}$) of the diode connected transistor 510.

The diode connected transistor 510 can be substantially matched (e.g., in dimensions) to the first transistor 401 and the second transistor 402 so the threshold voltage of the diode connected transistor 510 substantially matches the threshold voltages of the first transistor 401 and second transistor 402. In a possible implementation, the threshold voltage ($V_{TH}$) of the diode connected transistor 510 may be adjusted to have a difference (e.g., guard band) that can accommodate variations in the threshold voltages of the transistors in the pixel array. In a possible implementation, the threshold voltage can be in a range between about 0.2 volts and 0.9 volts (i.e., $0.2\leq V_{TH}\leq 0.9$).

The voltage of the reference node 515 can equal the HIGH bit line voltage 441 plus the threshold voltage. In other words, the voltage at the reference node can float above the HIGH bit line voltage 441 by the threshold voltage so that variations in the HIGH bit line voltage 441 also appear at the reference node 515.

The word line regulator 500 further includes a mirror circuit configured to transmit the reference voltage from the reference node 515 to an output node (i.e., output 545). The mirror circuit includes a reference transistor 520 coupled at a first source terminal(S) to the reference node 515 and having a first gate terminal (G) coupled to a first drain terminal (D). The mirror circuit further includes a driver transistor 540. The driver transistor 540 is coupled at a second gate terminal (G) to the first gate terminal of the reference transistor 520. The driver transistor 540 is also coupled at a second source terminal(S) to the output 545. The reference transistor 520 and the driver transistor 540 may be matched so that the gate-to-source voltage of each of the transistors is equal. This voltage may be created by currents generated by a reference current source 530 and a mirror current source 550, which provide equal currents in the legs of the mirror circuit. As a result, then voltage at the output 545 is equal to the threshold voltage above the HIGH bit line voltage.

The word line regulator 500 further includes a coupling transistor 560 configured to couple the output 545 to the word line 410 during the write operation. The coupling transistor may be coupled to a word line controller 565 configured to control the coupling transistor 560 so that the coupling transistor 560 the word line 410 of the SRAM cell 400. The output 545 may be coupled to multiple coupling transistors each coupled to a different word line of the pixel array so that the display may utilize the word line regulator 500 for their respective write operations. The write operation may begin when the word control line controls the coupling transistor in an ON condition.

The disclosed circuit has three different voltage domains. A first voltage domain is the voltage swing of the latch circuit ($V_{DD}-V_{SS}$), a second voltage domain is the voltage swing of the bit lines ($V_{BL\_H}-V_{BL\_L}$), and a third voltage domain is the voltage swing of the word line ($V_{WL}-V_{OFF}$). In a possible implementation $V_{SS}$. $V_{BL\_L}$, and $V_{OFF}$ are equal to a ground voltage (i.e., ground). In a possible implementation, $V_{DD}>V_{WL}>V_{BL\_H}$. The word line regulator 500 is configured to adjust the third voltage domain so that it can control the first transistor 401 and the second transistor 402 when they are operated between the first voltage domain and the second voltage domain.

Figure 6:
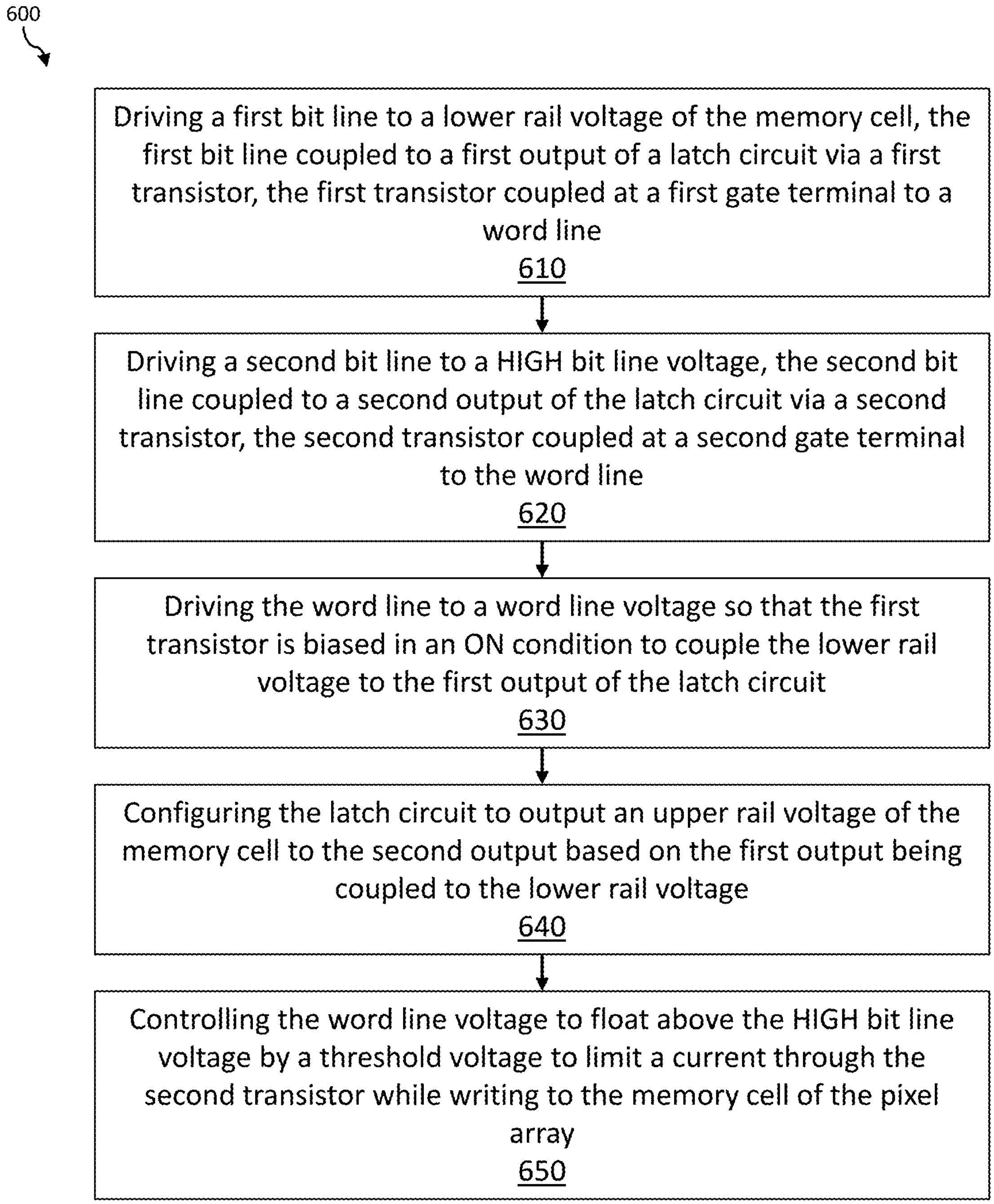
FIG. 6 is a flowchart of a method for writing to a memory cell of a pixel array according to a possible implementation of the present disclosure.

FIG. 6 is a flowchart of a method for writing to a memory cell of a pixel array according to a possible implementation of the present disclosure. The method 600 includes driving 610 a first bit line to a lower rail voltage ($V_{SS}$) of the memory cell (e.g., ground). The first bit line is coupled to a first output of a latch circuit via a first transistor (e.g., a first N-type metal oxide semiconductor transistor), and the first transistor is coupled at its gate terminal (i.e., a first gate terminal) to a word line. The method 600 further includes driving 620 a second bit line to a HIGH bit line voltage ($V_{BL\_H}$). The second bit line is coupled to a second output of the latch circuit via a second transistor (e.g., a second N-type metal oxide semiconductor transistor), and the second transistor is coupled at its gate terminal (i.e., a second gate terminal) to the word line. The method 600 further includes driving 630 the word line to a word line voltage ($V_{WL}$) so that the first transistor is biased in an ON condition to couple the lower rail voltage ($V_{SS}$) to the first output of the latch circuit. The method 600 further includes configuring 640 the latch circuit to output an upper rail voltage ($V_{DD}$) of the memory cell to the second output based on the first output being coupled to the lower rail voltage ($V_{SS}$). The method 600 further includes controlling 650 the word line voltage ($V_{WL}$) to float above the HIGH bit line voltage ($V_{BL\_H}$) by a threshold voltage ($V_T$) (i.e., $V_{WL}=V_{BL\_H}+V_T$) to limit (e.g., block) a current through the second transistor while writing to the memory cell of the pixel. The threshold voltage can be the threshold voltage of the first and second transistors.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

What is claimed is:

1. A pixel for a display, the pixel comprising:
a latch circuit powered by an upper rail voltage and a lower rail voltage;
a first bit line coupled to a first output of the latch circuit by a first transistor, the first transistor controlled in a ON condition during a write operation by a word line voltage on a word line and a LOW bit line voltage on the first bit line;
a second bit line coupled to a second output of the latch circuit by a second transistor, the second transistor controlled in an OFF condition during the write operation by the word line voltage and a HIGH bit line voltage on the second bit line; and
a word line regulator configured to receive the HIGH bit line voltage as a reference input, and dynamically track the HIGH bit line voltage in real-time, and control the word line voltage on the word line to float above the dynamically tracked HIGH bit line voltage on the second bit line by a threshold voltage to limit a current conducted by the second transistor in the OFF condition during the write operation.

2. The pixel for the display according to claim 1, wherein:
the LOW bit line voltage is the lower rail voltage; and
the latch circuit is configured to output the upper rail voltage to the second output based on the first output being coupled to the lower rail voltage.

3. The pixel for the display according to claim 1, wherein the write operation is a first write operation, and:
the first transistor is controlled in the OFF condition during a second write operation the word line voltage on the word line and the HIGH bit line voltage on the first bit line;
the second transistor is controlled in the ON condition during the second write operation by the word line voltage on the word line and the LOW bit line voltage on the second bit line; and
the word line regulator is configured to control the word line voltage on the word line to float above the HIGH bit line voltage on the first bit line by the threshold voltage to limit the current conducted by the first transistor in the OFF condition during the second write operation.

4. The pixel for the display according to claim 1, wherein:
the HIGH bit line voltage is less than the upper rail voltage; and
the LOW bit line voltage is equal to the lower rail voltage.

5. The pixel for the display according to claim 4, wherein the lower rail voltage is ground.

6. The pixel for the display according to claim 4, wherein the HIGH bit line voltage being less than the upper rail voltage reduces a power consumed by a bit line capacitance of the second bit line.

7. The pixel for the display according to claim 1, wherein:
the HIGH bit line voltage is 50 percent or less the upper rail voltage; and
the threshold voltage separating the HIGH bit line voltage and the word line voltage is in a range between about 0.2 volts and about 0.9 volts.

8. The pixel for the display according to claim 7, wherein the word line regulator includes:
a reference voltage source configured to receive the HIGH bit line voltage and generate a reference voltage at a reference node, the reference voltage being the HIGH bit line voltage increased by the threshold voltage.

9. The pixel for the display according to claim 8, wherein the reference voltage source is a diode-connected transistor that is substantially matched in dimensions to the first transistor and the second transistor, the diode-connected transistor coupled between the HIGH bit line voltage and the reference node.

10. The pixel for the display according to claim 8, wherein the word line regulator includes a mirror circuit to transmit the reference voltage from the reference node to an output.

11. The pixel for the display according to claim 10, wherein the mirror circuit includes:

a reference transistor coupled at a first source terminal to the reference node and having a first gate terminal coupled to a first drain terminal; and a driver transistor coupled at a second gate terminal to the first gate terminal of the reference transistor and coupled at a second source terminal to the output.

12. The pixel for the display according to claim 10, wherein the word line regulator includes a coupling transistor configured to couple the output to the word line during the write operation.

13. The pixel for the display according to claim 1, further comprising:

a drive switch coupled between a current source and a light emitting diode, the drive switch controlled ON/OFF by the first output or the second output of the latch circuit.

14. The pixel for the display according to claim 1, wherein the word line regulator is configured to adjust the word line voltage in response to the HIGH bit line voltage so that a difference between the word line voltage and the HIGH bit line voltage is constant over time and temperature.

15. A method for writing to a memory cell of a pixel array, the method comprising:

driving a first bit line to a lower rail voltage of the memory cell, the first bit line coupled to a first output of a latch circuit via a first transistor, the first transistor coupled at a first gate terminal to a word line;

driving a second bit line to a HIGH bit line voltage, the second bit line coupled to a second output of the latch circuit via a second transistor, the second transistor coupled at a second gate terminal to the word line;

receiving the HIGH bit line voltage at a word line regulator coupled to the pixel array and dynamically tracking the HIGH bit line voltage in real-time;

controlling the word line to float above the dynamically tracked HIGH bit line voltage by a threshold voltage using the word line regulator;

coupling the word line to the word line regulator so that the first transistor is biased in an ON condition to couple the lower rail voltage to the first output of the latch circuit and so that the second transistor is biased to limit a current at the second output of the latch circuit; and configuring the latch circuit to output an upper rail voltage of the memory cell to the second output based on the first output being coupled to the lower rail voltage.

16. The method for writing to the memory cell of the pixel array according to claim 15, wherein:

the upper rail voltage of the memory cell is at least two times greater than the HIGH bit line voltage.

17. The method for writing to the memory cell of the pixel array according to claim 16, wherein:

the HIGH bit line voltage being at least two times smaller than the upper rail voltage reduces a power consumed by a bit line capacitance.

18. The method for writing to the memory cell of the pixel array according to claim 15, wherein writing to the memory cell of the pixel array configures the memory cell in a first state, the method further comprising configuring the memory cell in a second state by:

driving the first bit line to the HIGH bit line voltage, the first bit line coupled to the first output of the memory cell via the first transistor;

driving the second bit line to the lower rail voltage of the memory cell, the second bit line coupled to the second output of the latch circuit via the second transistor;

coupling the word line to the word line regulator so that the second transistor is biased in the ON condition to couple the lower rail voltage to the second output of the latch circuit and so that the first transistor is biased to limit a current at the first output of the latch circuit; and configuring the first output of the latch circuit at the upper rail voltage of the latch circuit based on the first output being coupled to the lower rail voltage.

19. A pixel for a display comprising:

a word line;

a first bit line driven at a HIGH bit line voltage or a lower rail voltage;

a second bit line driven at the lower rail voltage when the first bit line is driven at the HIGH bit line voltage and driven at the HIGH bit line voltage when the first bit line is driven at the lower rail voltage;

a latch circuit configured to output an upper rail voltage or the lower rail voltage;

a first transistor connected at a first drain terminal to the latch circuit, connected at a first source terminal to the first bit line, and connected at a first gate terminal to the word line;

a second transistor connected at a second drain terminal to the latch circuit, connected at a second source terminal to the second bit line, and connected at a second gate terminal to the word line; and a word line regulator configured to receive the HIGH bit line voltage, dynamically track the HIGH bit line voltage in real-time, and generate a word line voltage on the word line that floats above the dynamically tracked HIGH bit line voltage by a reference voltage, the HIGH bit line voltage being less than the upper rail voltage.

20. The pixel for the display according to claim 19, wherein the word line regulator includes a diode-connected transistor configured to generate the reference voltage, the diode-connected transistor substantially matched in dimensions to the first transistor and the second transistor.

* * * * *